US008302071B2

(12) United States Patent
Gschwind et al.

(10) Patent No.: US 8,302,071 B2
(45) Date of Patent: Oct. 30, 2012

(54) METHOD OF AUTOMATIC PATTERN BASED EDITING OF BUSINESS MODELS

(75) Inventors: Thomas Gschwind, Zurich (CH); Jana Koehler, Oberrieden (CH); Jochen M. Kuester, Zurich (CH); Michael S. Wahler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 12/182,682

(22) Filed: Jul. 30, 2008

(65) Prior Publication Data
US 2010/0031230 A1 Feb. 4, 2010

(51) Int. Cl.
*G06F 9/44* (2006.01)
(52) U.S. Cl. ........................................ 717/105; 717/109
(58) Field of Classification Search .................. 717/105, 717/109
See application file for complete search history.

(56) References Cited

U.S. PATENT DOCUMENTS
7,171,647 B1 1/2007 Smith et al.
2008/0312992 A1* 12/2008 Hoshi et al. ........................ 705/7

FOREIGN PATENT DOCUMENTS
WO 02088877 A2 11/2002

OTHER PUBLICATIONS

Russel, "Workflow Control-flow Patterns A Revised View", 2006, http://www.workflowpatterns.com/documentation/, p. 1-134.*
Matichuk, "System and Method for the Automatic creation of graphical representation of navigation paths generated by intelligent planner", Nov. 2002, wipo, WO 02/088877, p. 1-29.*

* cited by examiner

*Primary Examiner* — Li B Zhen
*Assistant Examiner* — Duy Khuong Nguyen
(74) *Attorney, Agent, or Firm* — Cantor Colburn LLP; Daniel Morris (57) ABSTRACT

A method of automatic pattern based editing of business models on a canvas of business model editing application includes receiving a request to automatically edit a business model, constructing an initial current set C of elements from the business model, constructing an initial next set N of elements from the business model, and connecting elements between the initial current set C and the initial next set N until all elements in both the initial current set C and the initial next set N have been connected. The connecting is based on at least connecting elements sequentially if the elements exist from left to right on the canvas, and connecting elements in parallel or using a decision and merge combination if the elements exist from top to bottom on the canvas.

4 Claims, 12 Drawing Sheets

METHOD OF AUTOMATIC PATTERN BASED EDITING OF BUSINESS MODELS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

This invention generally relates to editing of business models. More particularly, this invention relates to automatic pattern based editing of business models.

2. Description of Background

Generally, creating business models in graphical notation is tedious and time-consuming. For example, users must create individual elements for every task, select individual elements for placement, add decisions or other operations, and interconnect each element. Editing of business models may also be as time consuming as moving or replacing tasks or elements leaves the necessity to also replace and/or reconnect every lost connection, decision, operation, etc.

SUMMARY

A method of automatic pattern based editing of business models on a canvas of business model editing application includes receiving a request to automatically edit a business model, constructing an initial current set C of elements from the business model, constructing an initial next set N of elements from the business model, and connecting elements between the initial current set C and the initial next set N until all elements in both the initial current set C and the initial next set N have been connected or no suitable connection options can be found for the remaining elements. The initial set C contains all elements that are positioned left-most on the canvas and that are approximately on the same X-axis position. The initial next set N contains the left-most element that is not contained in the current set C and all the elements that are approximately on the same X-axis. The connecting is based on at least connecting elements sequentially if the elements exist from left to right on the canvas, and connecting elements in parallel if the elements exist from top to bottom on the canvas.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains an exemplary embodiment, together with advantages and features, by way of example with reference to the drawings.

DETAILED DESCRIPTION

According to an exemplary embodiment, a method is provided which significantly reduces the time required to create graphical representations of business models. This decrease in the time-consuming nature of business model creation therefore increases productivity and allows users to focus on functional elements of business model creation.

According to an exemplary embodiment, a method of automatic pattern based editing of business models automatically connects entire groups of elements (e.g., tasks, decisions blocks, etc.) through consideration of their respective locations (i.e., coordinates) on a canvas or business model editing user interface. For example, the method may consider relative proximity, position, vertical alignment, horizontal alignment, and/or other such location specific attributes and compare said attributes against predefined or desired patterns. The comparison against predefined or desired patterns may increase the desired output of the automatic algorithm, thereby achieving a relatively productive result. It is noted that as used herein, the terms tasks and activities may be used interchangeably. Furthermore, these terms are not limited to only tasks and activities, but should encompass any element that may be placed on a canvas as a portion of a business model. A precise definition of particular operations of atomic operands of business models and/or exhaustive description of every iteration of possible elements is not the purpose of this disclosure.

Business users may draw business process models in a manner which functionally decomposes the process. For example, the users identify the functional steps and place activities, which are either atomic tasks or sub-process symbols, representing these steps on a canvas or user interface representing the same. Users may also add branching logic and connections to model alternative or parallel branching flows and cycles.

Although it may be relatively easy to draw a single connection or branching flow, as the number of tasks in a model increases, the number of connections and/or decisions, operations, etc., increase dramatically. Therefore, drawing connections and/or branches becomes exceedingly tedious. Furthermore, users may have to constantly perform micro-editing operations which distract from the overall process model being drawn. For example, micro-editing operations may include creating individual elements for every task, selecting individual elements for placement, adding decisions or other operations, and interconnecting each element. Therefore, exemplary embodiments provide users with automatic connections based on geometric placement of tasks/activities on a canvas or user interface. Hereinafter, various figures illustrate a plurality of scenarios of placement of tasks/activities/elements, such that a better understanding of exemplary embodiments will be gained.

Figure 1:
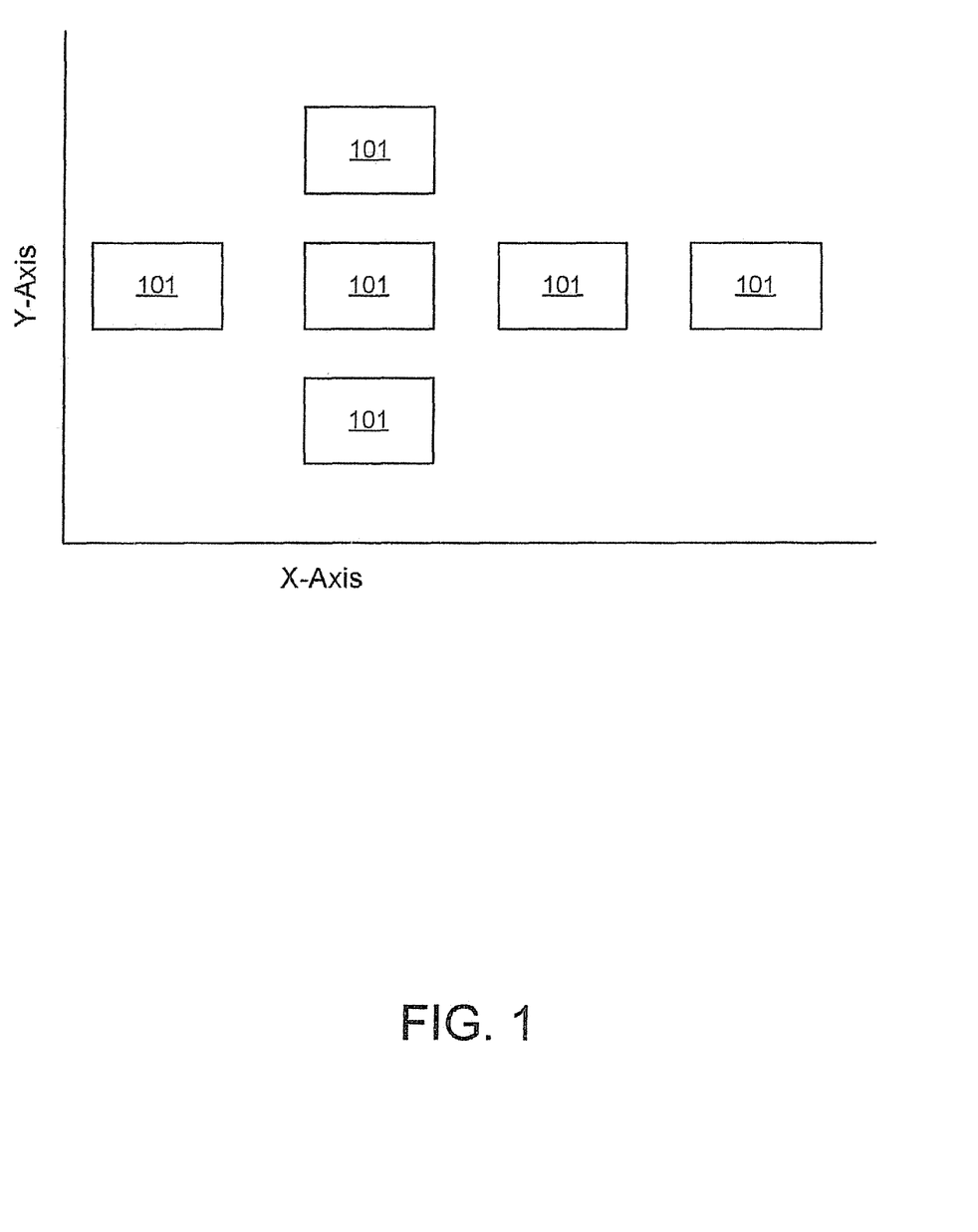
FIG. 1 illustrates a graphical layout of elements of an exemplary business model, according to an exemplary embodiment.

Turning to FIG. 1, a graphical layout of elements of an exemplary business model is illustrated. As shown, a plurality of tasks 101 are distributed on a canvas represented by a two-dimensional plane. According to exemplary embodiments, an assumption may be made that tasks placed on a canvas from left to right are intended to be performed in sequential order or succession. For example, if a single task is placed to the right of another task with reference to the x-axis, exemplary embodiments will interpret the right-most task as being performed last. Further, if tasks/activities are placed above each other with reference to the y-axis, exemplary embodiments may assume the tasks are intended to be performed in parallel, such as with a sequence split or through a decision or choice block. Alternatively, through simple geometric transformations, the methodologies described herein may be applied to any order of placement of elements. For example, right-to-left, top-to-bottom, bottom-to-up, or any other placement. Such may be edited based on user-defined settings or other attributes selectable to a user.

Figure 2:
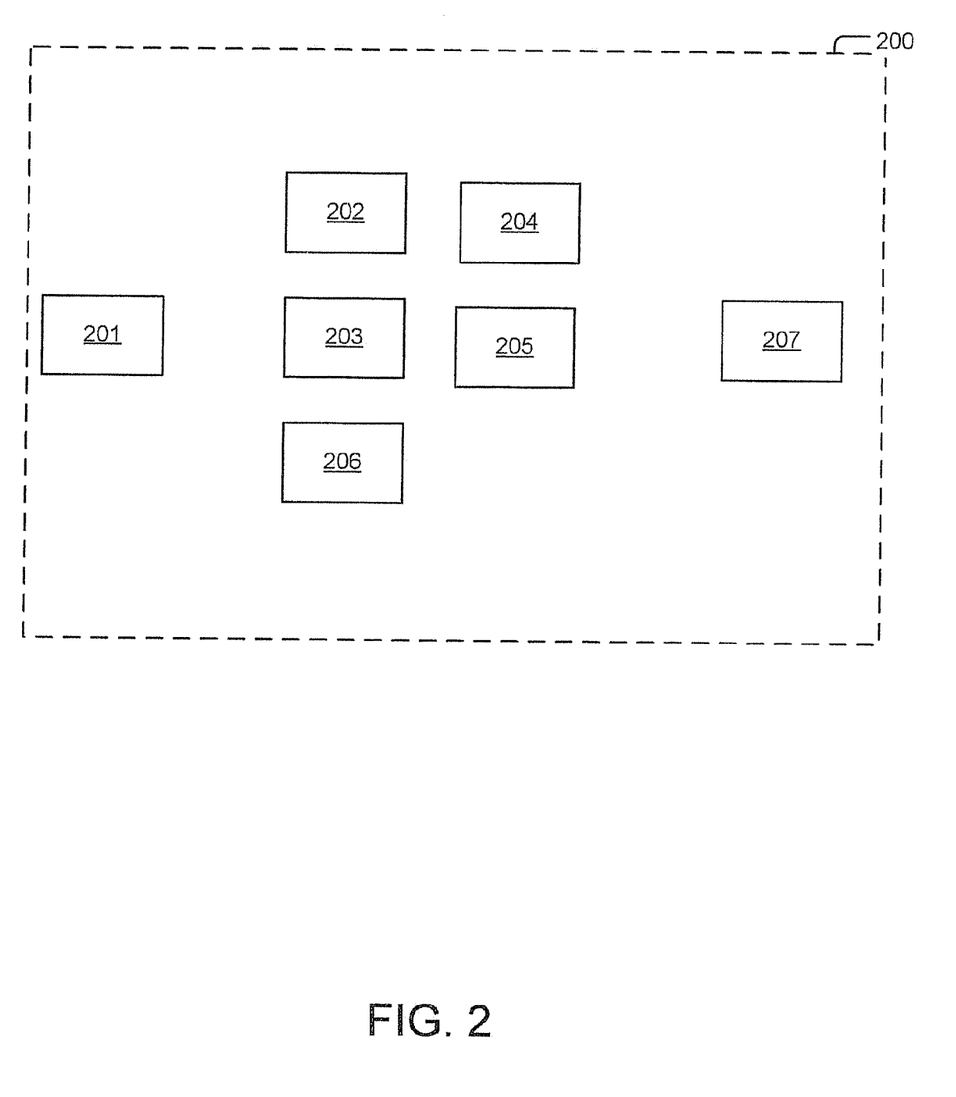
FIG. 2 illustrates a set of elements for an exemplary business model, according to an exemplary embodiment.

Turning to FIG. 2, a set of elements for an exemplary business model are placed on a canvas 200. The canvas 200 may be outlined or may be a portion of a user interface. As illustrated, elements 201, 202, 203, 204, 205, 206 and 207 are placed in such a manner as to promote the assumption that a business process would flow from element 201 to element 207. Furthermore, elements 202, 203 and 206 may be performed in parallel or by choice, followed by elements 204 and 205, as described by the assumptions given with reference to FIG. 1. Therefore, if exemplary embodiments were to automatically interconnect the uncompleted model represented by FIG. 2, an interconnection may be represented by FIG. 3.

Figure 3:
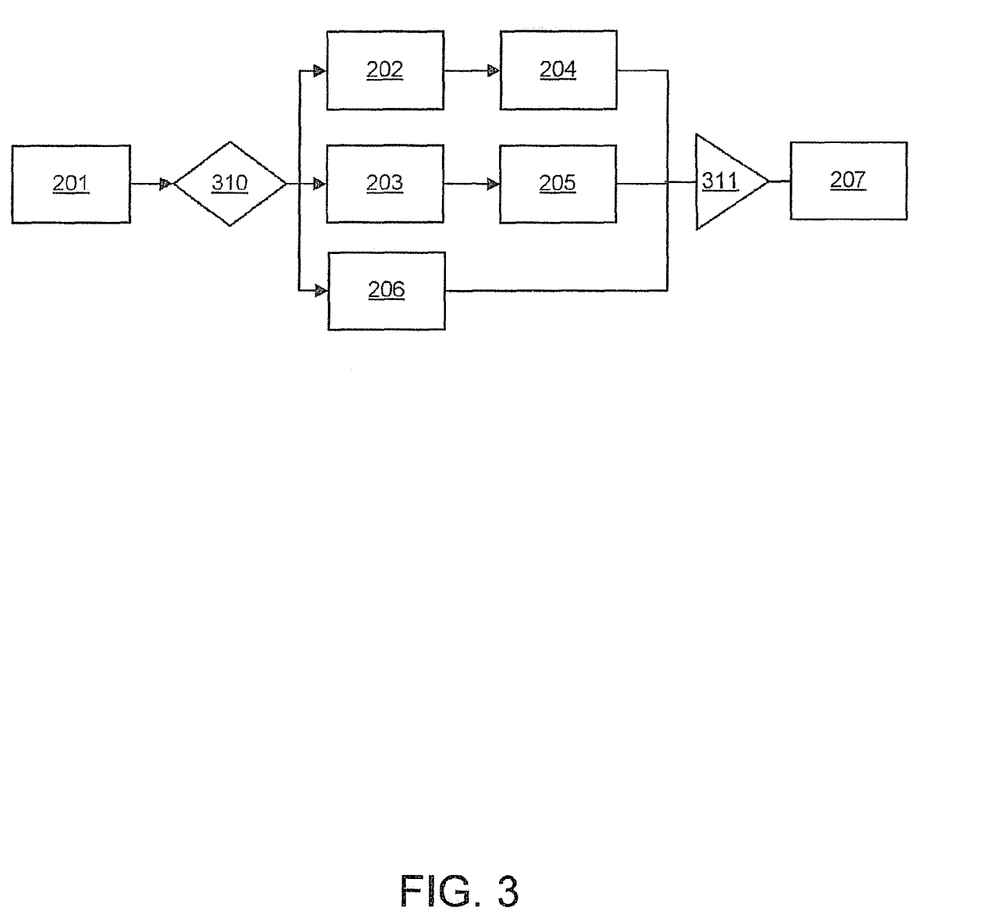
FIG. 3 illustrates a connected model which can be derived from FIG. 2, according to an exemplary embodiment.

FIG. 3 shows a connected model, which is plausible considering the graphical placement of the elements explained with reference to FIG. 2. For example, decision block 310 has been automatically added resulting in a choice between elements 202, 203, and 206. Furthermore, tasks 204 and 205 are performed in succession to tasks 202 and 203, respectively. Transfer block 311 (or alternatively termed merge block 311) has also been automatically added to branch in the three branches from elements 204, 205, and 206, such that element 207 may be performed last. This may represent a sequence and sequence split, which is described further below.

It is noted that when only evaluating the geometric position of the process elements, automatic-connection of entire element groups may not return entirely desired results because elements are typically placed imprecisely onto the process-modeling pane or canvas. It is therefore not always possible to generate a plausible connection of the model. Furthermore, the proposed connections should lead to a model which is for example free of deadlocks and live-locks. By using predefined or desired patterns, the likelihood of a plausible connection can be increased and a more correct model may be presented to the user. Basic patterns may be used by the automatic-connect method. These basic patterns include sequence and sequence split (or exclusive choice). It is noted that exemplary embodiments are not limited to only these two basic patterns as other patterns may easily be included in the exemplary methodologies explained herein.

The sequence pattern allows the automatic-connect method to recognize and correctly connect sequences of elements. The sequential split pattern enables the method to recognize alternative branching regions such as portions of a canvas which have different spacing between elements. These are connected and placed between guarding decision and merge gateways that are automatically added to the canvas by the method.

Figure 4:
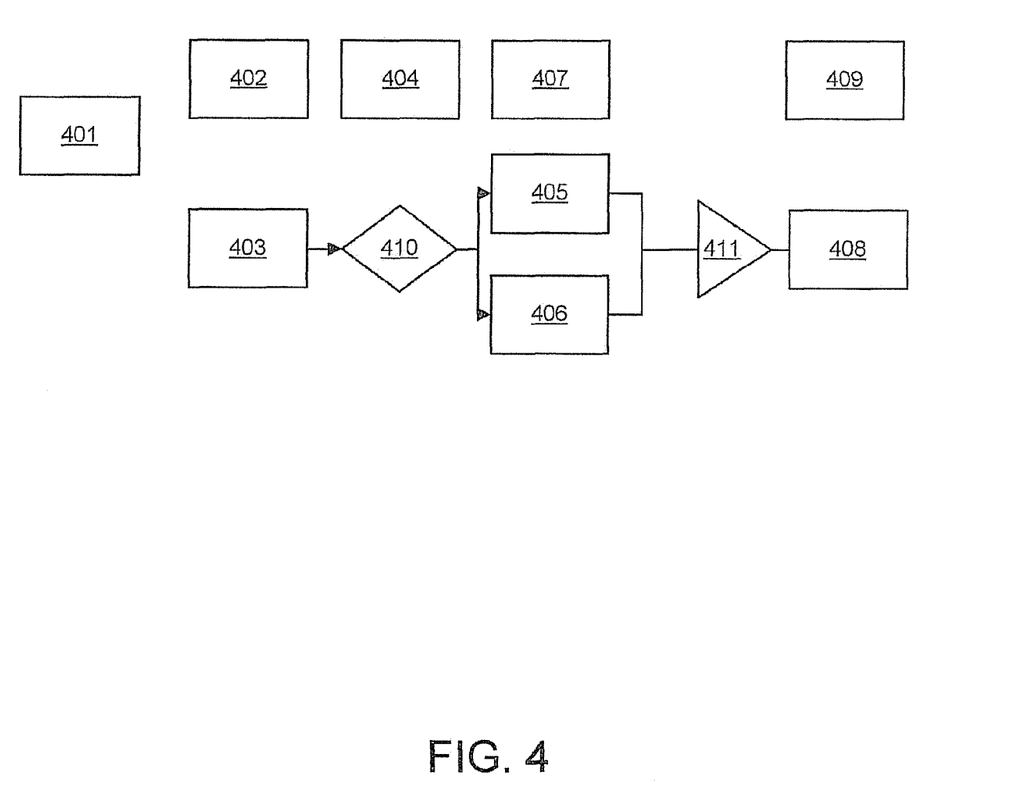
FIG. 4 illustrates an exemplary business model with a partially connected fragment, according to an exemplary embodiment.

It is also possible to embed the auto-connect method into an iterative modeling approach used by the user where manual editing steps and automatic-connections are interleaved. This is advantageous to avoid that the automatic-connect method is applied to too large sets of elements. In case of very large sets, it may become increasingly difficult for the user to obtain a proper graphical layout that matches the patterns used by the automatic-connect method. Furthermore, multiple options may exist to correctly connect the elements of a process, which may be difficult to differentiate. FIG. 4 illustrates an exemplary business model with a partially connected fragment. It is noted that this partial connection is not the only plausible one (e.g., task 407 may also have been considered as part of the sequential split).

Figure 5:
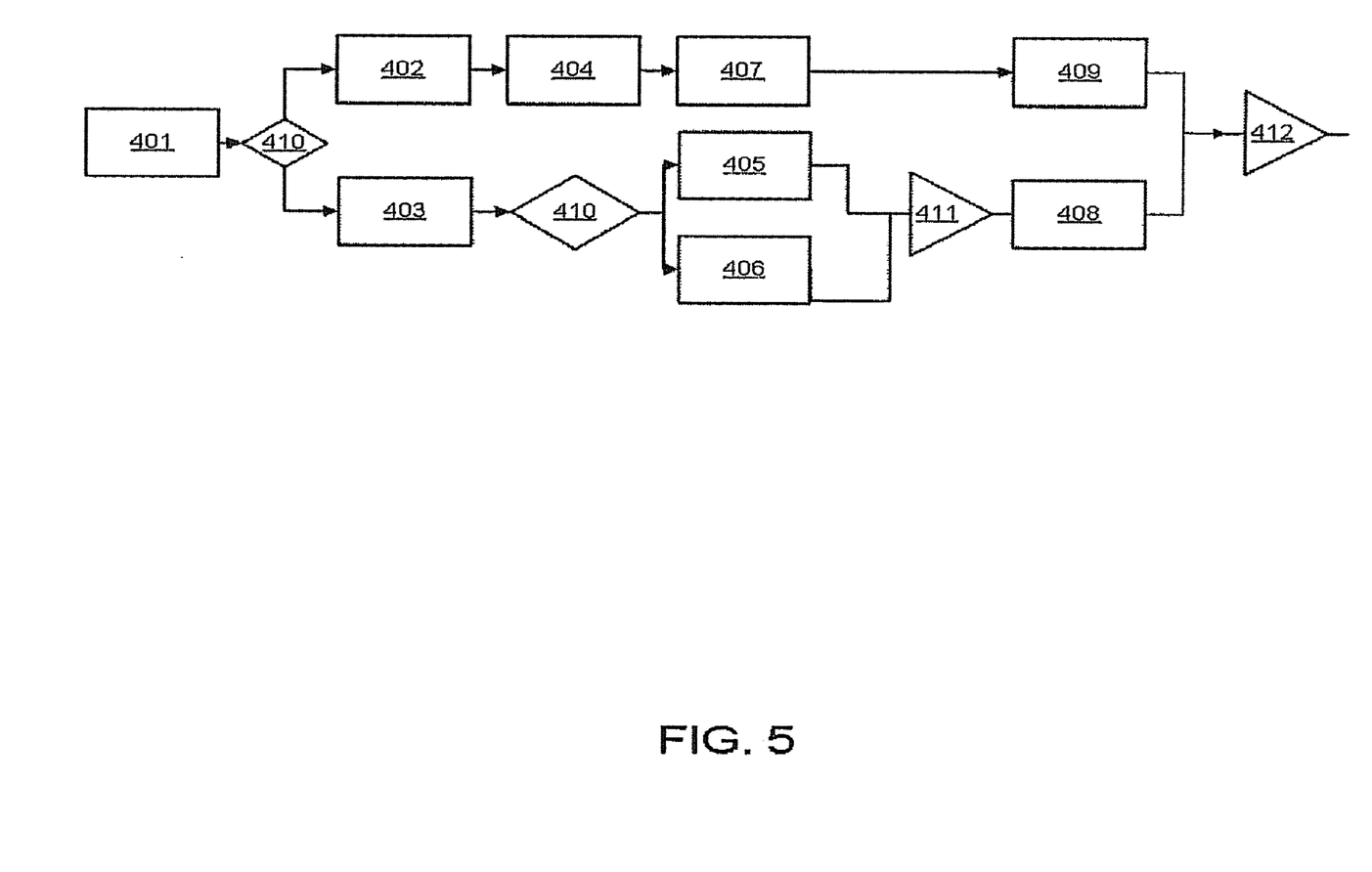
FIG. 5 illustrates an exemplary fully connected business model which can be derived from FIG. 4, according to an exemplary embodiment.

In order to achieve the desired connection, the user may begin placing a group of elements on the canvas. The group may be matched against the patterns and the elements in the group may be automatically-connected. Subsequently, a second group of elements is put on the canvas, connected with the previously connected group, and so on. Alternatively, the user can put all elements on the canvas, and select a first group of elements to which the automatic-connect method is applied. The method is able to recognize already connected groups of elements and connect such groups properly to other non-connected elements. For example, in FIG. 4, the user may first place tasks 403, 405, 406, and 408 on the canvas, and auto-connect these elements before continuing to add the remaining elements. This enables the method to produce a fully connected model as shown in FIG. 5.

Figure 6:
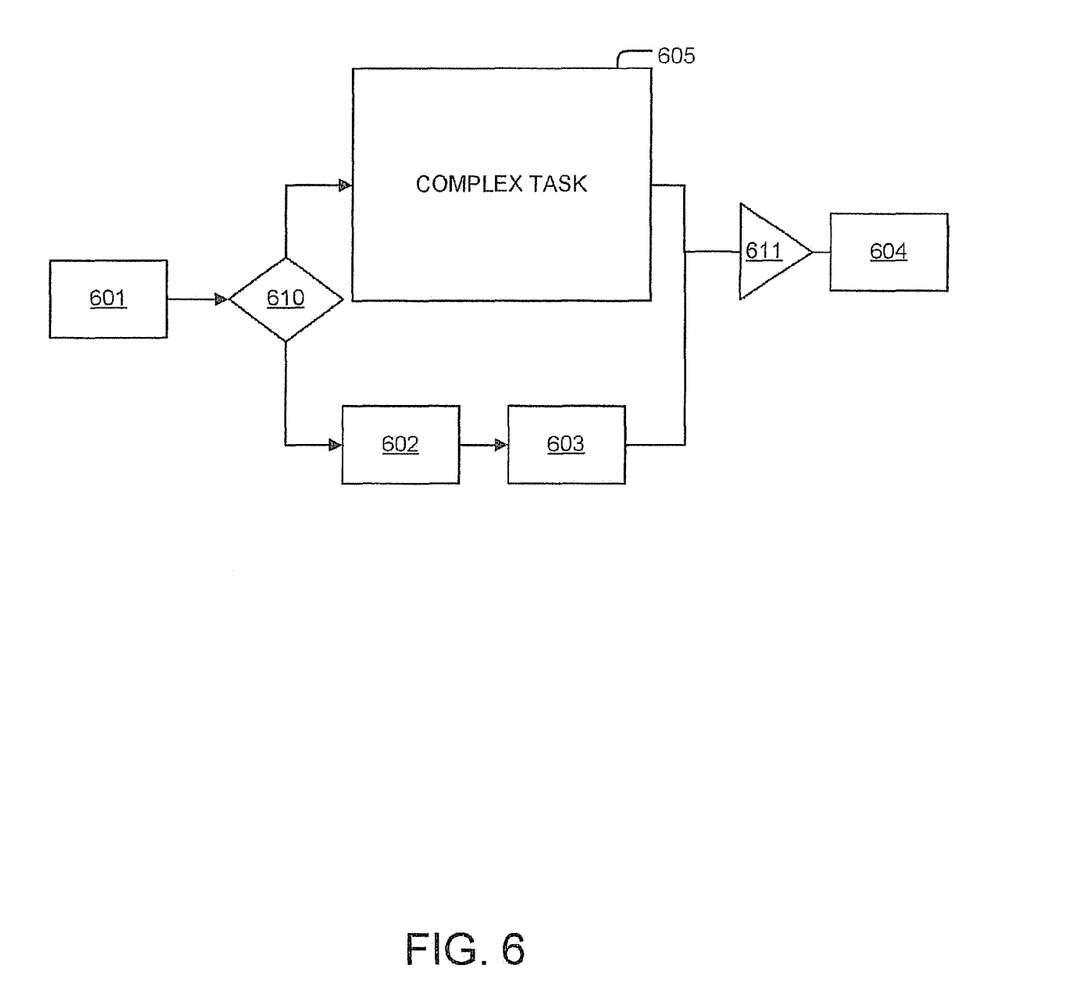
FIG. 6 illustrates a business model with a complex fragment which has been automatically linked to other process elements, according to an exemplary embodiment.

The user may also interleave automatic-connection with manual connection steps in case very complicated process structures have to be modeled. FIG. 6 illustrates such a scenario. The framed complex task 605 of the process model has been manually connected by the user. The connection of the process fragment with other elements on the canvas is possible using the automatic-connect method, which adds the decision and merge gateways as well as the required connections (i.e., from decision block 610 and to merge block 611). It is noted that according to example embodiments, the automatic-connect method may not change any user-initiated connections, such as, for example, any connections within the complex task 605.

It is noted that the automatic-connection method may require a geometric algorithm capable of recognizing the sequence and sequential split patterns based on the graphical layout of the activity elements on the canvas or user interface. In order to do so, the algorithm may scan the canvas or interface from left to right, and cluster the elements into groups of elements on sequential and splitting branches.

For example, elements that are positioned horizontally to each other on approximately the same Y-axis position may be considered to be in sequence to each other. The method may also allow a deviation of the height of the element's graphical shape in order to be considered as being on "approximately the same" location on the Y-axis. For example, an appropriate percentage value may be approximately ±66%.

Furthermore, elements that are drawn below each other on approximately the same location on the X-axis may be considered to be part of a sequential split. Again, the method may allow a certain margin of error. In typical business model graphics, elements are wider than high and hence, the algorithm may be more tolerant on the X-axis than on the Y-axis. Therefore, an appropriate percentage value for X-axis deviation may be approximately ±100%. It is noted that the deviation values given hereinbefore are for example purposes only, and are not to be construed as limiting. Any values which give appropriate results for a particular implementation may be satisfactory.

Figure 7:
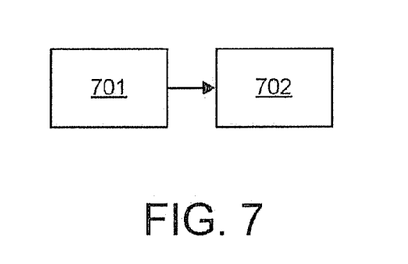
FIG. 7 illustrates an exemplary business model with a 1:1 connection between the current set and the next set, according to an exemplary embodiment.
Figure 8:
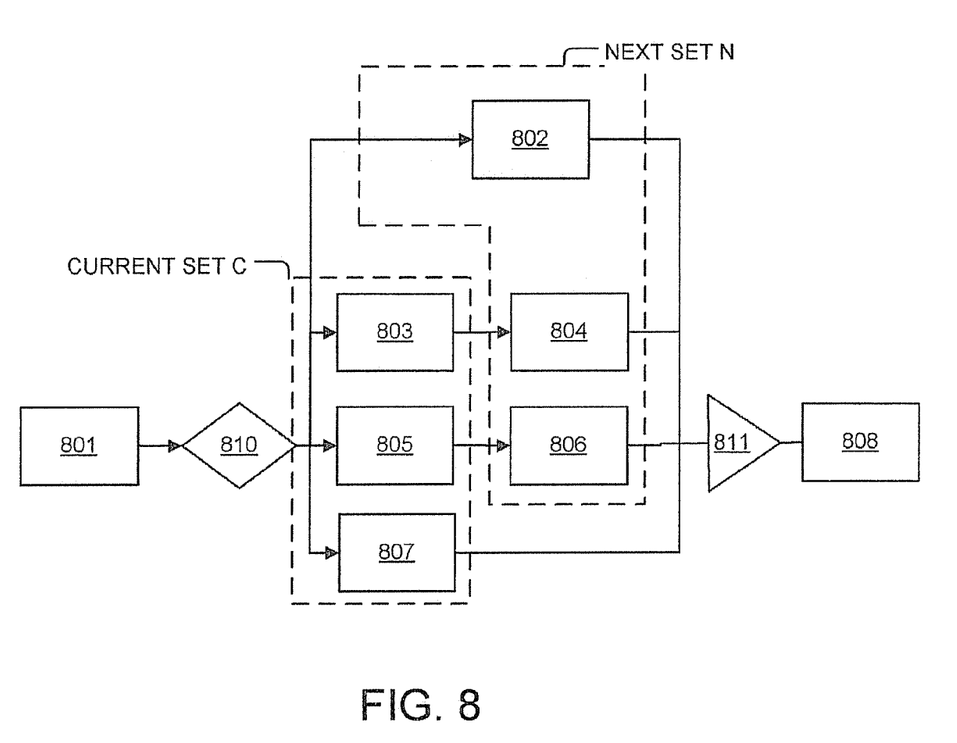
FIG. 8 illustrates an exemplary business model with an m:n connection between the current set and the next set, according to an exemplary embodiment.
Figure 9:
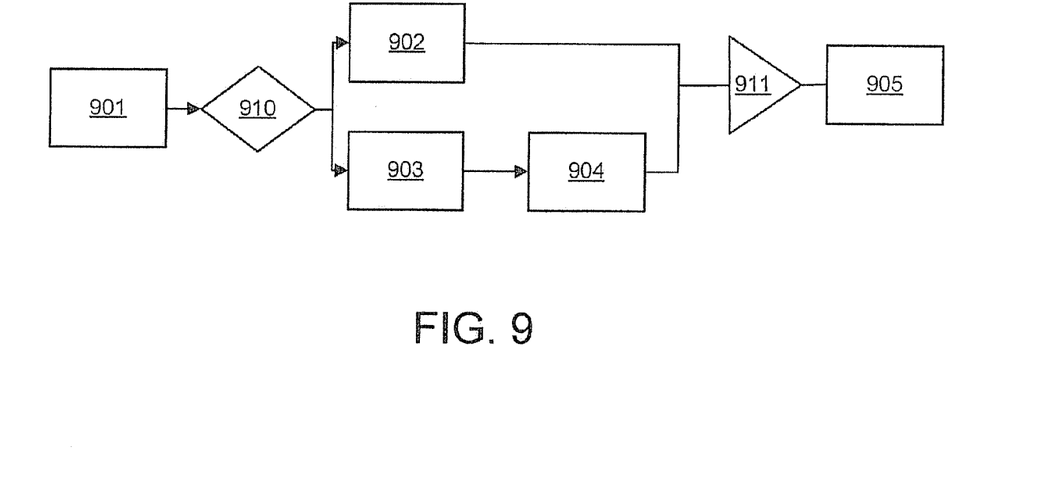
FIG. 9 illustrates an exemplary business model with an n:1 connection between the current set and the next set, according to an exemplary embodiment.

Hereinafter, a detailed description of the geometric algorithm portion of the automatic-connection method is given with reference to FIGS. 7-9 and four independent operations. The independent operations use two sets which are referred to as the current set C and the next set N. The next set N represents elements that immediately follow the elements of the current set C. More clearly, the elements of the next set N are the closest to the elements of the current set C if scanning along the X-Axis from left to right.

If the geometric algorithm identifies the beginning and end of a sequential split, it puts a decision gateway before the beginning of the split and a merge gateway after the end of the split unless it has already been provided by the user. This may be possible if there is at least a certain amount of space between those elements where the gateway is inserted. The amount of space is a predefined or desired amount. For example, FIG. 2 shows that the tasks 201 and 207 have a larger horizontal distance to their respective neighbor tasks than the other tasks.

The first independent operation includes constructing the initial current set C. The initial set C contains those elements that are positioned left-most on the canvas and that are approximately on the same X-axis position. If the current set does not contain a start node, a start node can be added to the process and a connection from the start node to all the elements in the current set is drawn. If the current set contains more than one element, a decision is inserted between the start node and the elements.

The second independent operation includes constructing the next set N. The next set contains the left-most element that is not contained in the current set and all the elements that are approximately on the same X-axis. If no such elements can be found, all elements have been connected and the algorithm terminates by adding a stop node to the model. If more than one element is contained in the current set (i.e., there are several branches that have not been merged yet) a merge gateway is inserted between the last elements of these branches and the stop node and the connections are properly drawn.

The third independent operation includes connecting elements in the current set C with the next set N. In this step, the algorithm attempts to connect the elements in the current set with those elements in the next set. There are several scenarios that may arise depending on the number of elements in the current set and the next set.

According to an exemplary embodiment, a scenario includes a 1:1 connection where there is only one element in the current set and only one element in the next set. Only a single 1:1 connection is possible between these two activity elements. Hence, the algorithm connects the element in the current set with the one in the next set (see FIG. 7, 1:1 connection between tasks 701 and 702). This type of connection identifies sequences. If a sequence occurs within a split, it may be termed a branch. Each sequence (or branch) has a unique first and last element. When referring to connecting a branch or a complex region as shown in 605 in FIG. 6 to an element, the last element of this branch or complex region is connected to the element. Similarly, when referring to connecting an element to a branch or a complex region (605 in FIG. 6), the element is connected to the first element of the branch or region.

According to an exemplary embodiment, another scenario includes a 1:n connection where several splitting branches open up in the process model. If the element in C is a decision gateway, the algorithm connects the elements in N to the gateway. Otherwise, the algorithm inserts a decision gateway with |N| branches and connects the element in the current set to this gateway and the gateway's branches to the elements in the next set.

According to an exemplary embodiment, another scenario includes a m:n connection where there are splitting branches in both sets. In this scenario, the activity elements in C are connected to those activity elements in N that are approximately on the same Y-axis. Elements in the next set that remain unconnected are connected to the last decision gateway that has been encountered. This gateway should exist, because the algorithm has recognized the splitting branches and introduced a decision gateway in an earlier scanning step. An example of such a connection is between the decision 810 and element 802 in FIG. 8. Those elements from current set that remain unconnected (i.e., have no outgoing connection) because there is no matching element in next set are added to the next set and considered in the next scanning step (not illustrated in FIG. 8).

According to an exemplary embodiment, another scenario includes an n:1 connection. It is noted that an n:1 connection may not be as simple as the inverse of the 1:n scenario, unless an element in N is a merge gateway. It may be that one branch has more elements than others as illustrated by FIG. 9 where the upper branch only consists of task 902, while the lower branch consists of tasks 903 and 904. The algorithm is expected to add connections and decision and merge gateways 910 and 911, respectively.

Furthermore, in the third independent operation, three cases should be considered. In the first case, if the element has approximately the same Y-axis coordinate as one of the previous branches and the element is close enough to its predecessor element in the branch such that the minimal required distance to place a gateway is not available, the element is connected to the predecessor (i.e., the algorithm assumes that both elements belong to the same branch). All elements in the current set to which no outgoing connections can be added in this scanning step are put into the next set. It is noted that tolerances, as discussed above, may be implemented to allow for some deviation with regards to element placement.

In the second case, if the element does not have approximately the same Y-axis coordinate as one of the previous branches, or if there is enough space to fit a gateway between the rightmost element in the current set and the element in the next set, the algorithm inserts a merge gateway with |C| branches. It adds connections from the elements in C to the gateway and from the gateway branch to the single element in N.

In the third case, N contains a single merge or join gateway, thus all branches in the current set are connected to this gateway. If N set contains a decision gateway, a merge gateway is added, which is connected to the decision gateway. A gateway may occur when the user is working in an iterative mode where the user automatically-connects various subgroups of elements first, followed by automatically-connecting the (already connected) subgroups.

Referring now to the fourth independent operation, when the geometric algorithm has connected the elements in C to those in N or put those elements that could not be connected into N, N becomes the current set C and the algorithm continues with independent operation two until all elements have been considered, automatically connected, or a request to terminate has been received, as is defined in the description of the second independent operation.

As described hereinbefore, the automatic-connect method may utilize two basic patterns when matching graphical layouts. It is noted that further patterns may be added, and that less patterns may be used as well. However, using the method with two basic patterns may have the advantage that the user needs to obey only simple layout rules when placing elements on the canvas. For example, the rules may include elements forming part of a sequence should be placed on approximately the same Y-axis, elements forming part of a split should be placed on approximately the same X-axis, the beginning and end of a split should be indicated by leaving additional horizontal space between the last element before the split and all first elements in the splitting branches, as well as the last elements in the splitting branches and the first element after the split, and/or no gateways need to placed on the canvas by the user. It is noted however that if there are gateways (either placed on the canvas by the user or created by previous invocations of the automatic-connect method), they are considered by the algorithm.

To increase the flexibility of the algorithm with respect to the set of recognized patterns, exemplary embodiments include another approach that provides the user with smart editing macros that the user can interleave with invocations of the automatic-connect method. These macros provide the user with additional modeling patterns.

Figure 11:
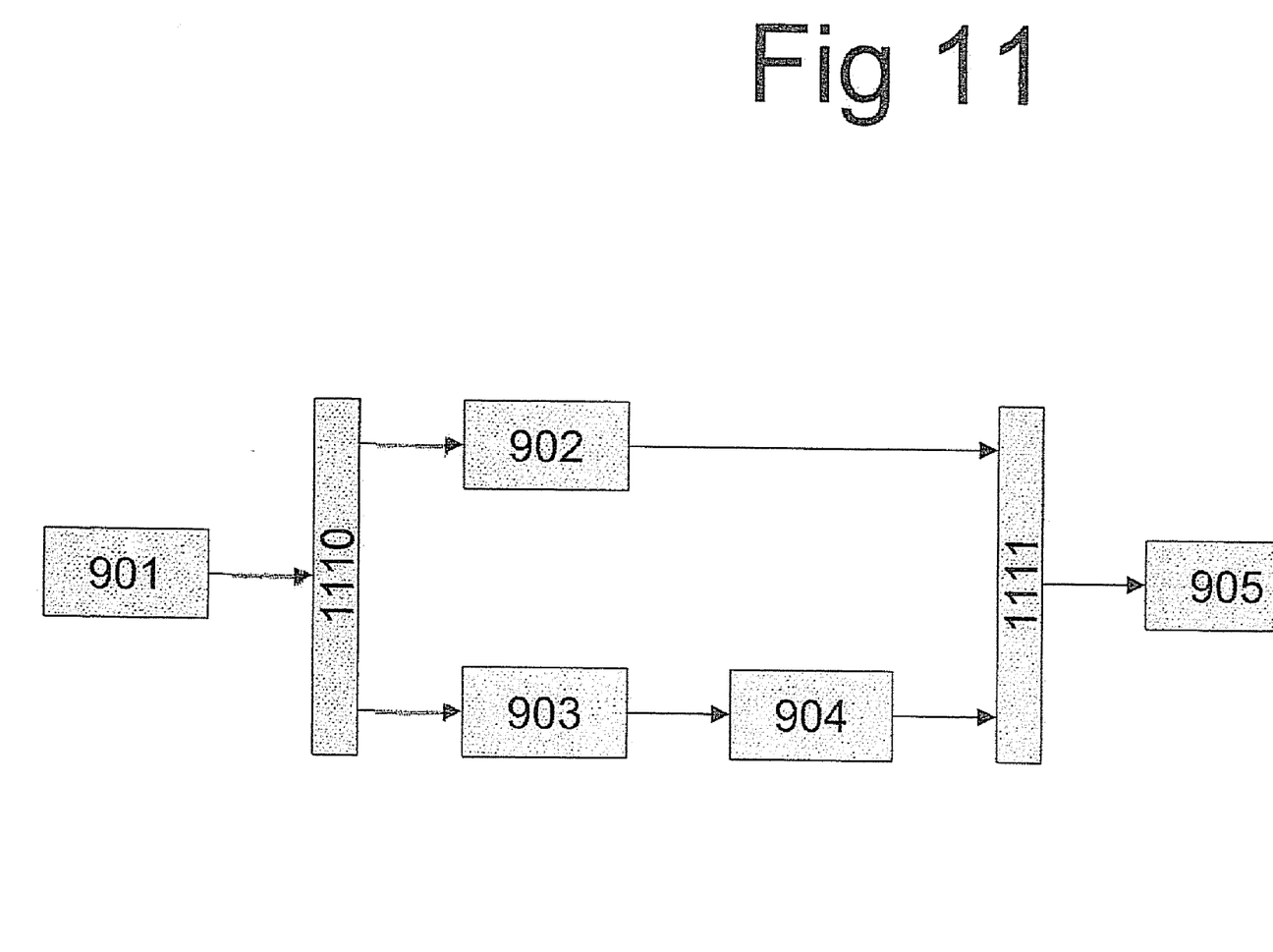
FIG. 11 illustrates an exemplary business model fragment that has been converted into a parallel fragment, according to an exemplary embodiment.

According to at least one exemplary embodiment, an additional modeling pattern includes a parallel split. A parallel split includes a user selecting a single decision gateway. The macro can be applied in different ways. For example, only the selected gateway is flipped (i.e., a decision is changed into a fork and vice versa) while a merge is changed into a join and vice versa). Alternatively, the selected gateway and its matching gateway are flipped (i.e., for a decision/fork the corresponding merges/joins are determined and vice versa). Additionally, a gateway may be selected, but all gateways in the process fragment containing the selected gateway are flipped. For example, when applied to a fragment containing decision/merge gateways such as the one shown in FIG. 9, the macro generates a parallel splitting region by converting the alternative gateways 910 and 911 into their parallel counterparts 1110 and 1111 as shown in FIG. 11. Furthermore, according to example embodiments, the macro may be applied in other alternatives not described herein. For example, the automatic connect method may create fork and join connections initially, and later enable a user to select these connections to changes them into decision and merge gateways, respectively.

Figure 10:
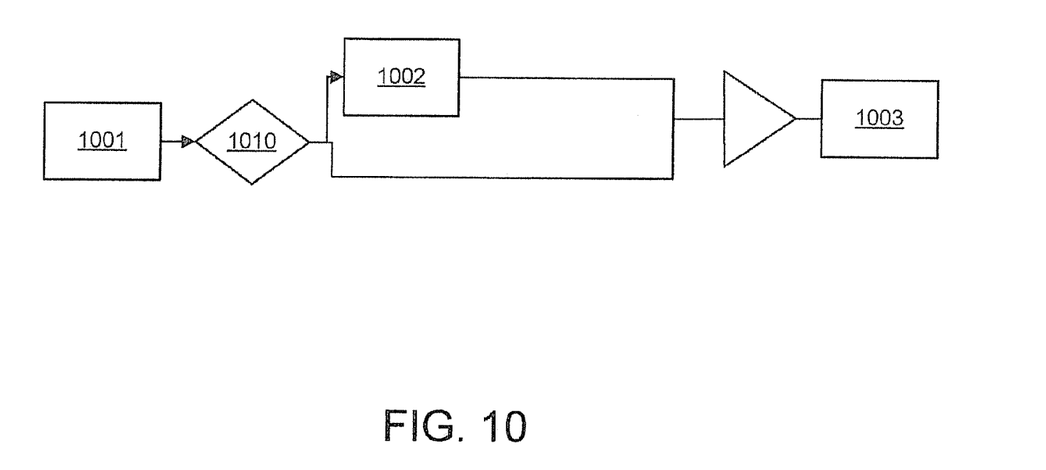
FIG. 10 illustrates an exemplary business model with an optional branch, according to an exemplary embodiment.

According to at least one exemplary embodiment, an additional modeling pattern includes an optional branch. An optional branch may be a special case of the alternative split where one branch is empty (i.e., it does not contain any elements). The user selects a single element or a sequence of elements and then applies this macro. The element or sequence is embedded into an optional branch (see FIG. 10, optional branch after decision 1010).

According to at least one exemplary embodiment, an additional modeling pattern includes an arbitrary cycle. In an arbitrary cycle, a backward connection is added to the model either based on a selection of elements by the user or by having the user place merge-decision gateway pairs on the canvas. The generation of cycles is limited to fully connected diagrams representing a correct process model in order to produce high-quality process models. In one implementation, the user is prompted to select elements to embed into a loop. If only a single element is selected, a self-loop is created around this element. If more than two elements are selected, the algorithm automatically expands the elements to the smallest enclosing fragment to which a loop can be safely added and creates a loop surrounding that fragment.

If two elements are selected, they are interpreted as the entry and exit elements of the loop. If the elements are the entry and exit elements of a region, the loop can be safely added to the diagram. For example, a region may be a set of elements connected to each other having one entry and one exit (i.e., one inward connection and one out-going connection). If the test fails, the elements are contained within a fragment to which the loop can be safely added (e.g., the fragment matches the Arbitrary Sequential Loop pattern). Alternatively, if no loop can be safely added having the selected elements as entry and exit, the method can refuse to add a loop, because it would violate the correctness of the model. Additionally, it can propose the smallest fragment to the user, which contains the selected elements and around which a loop can be safely placed.

Figure 12:
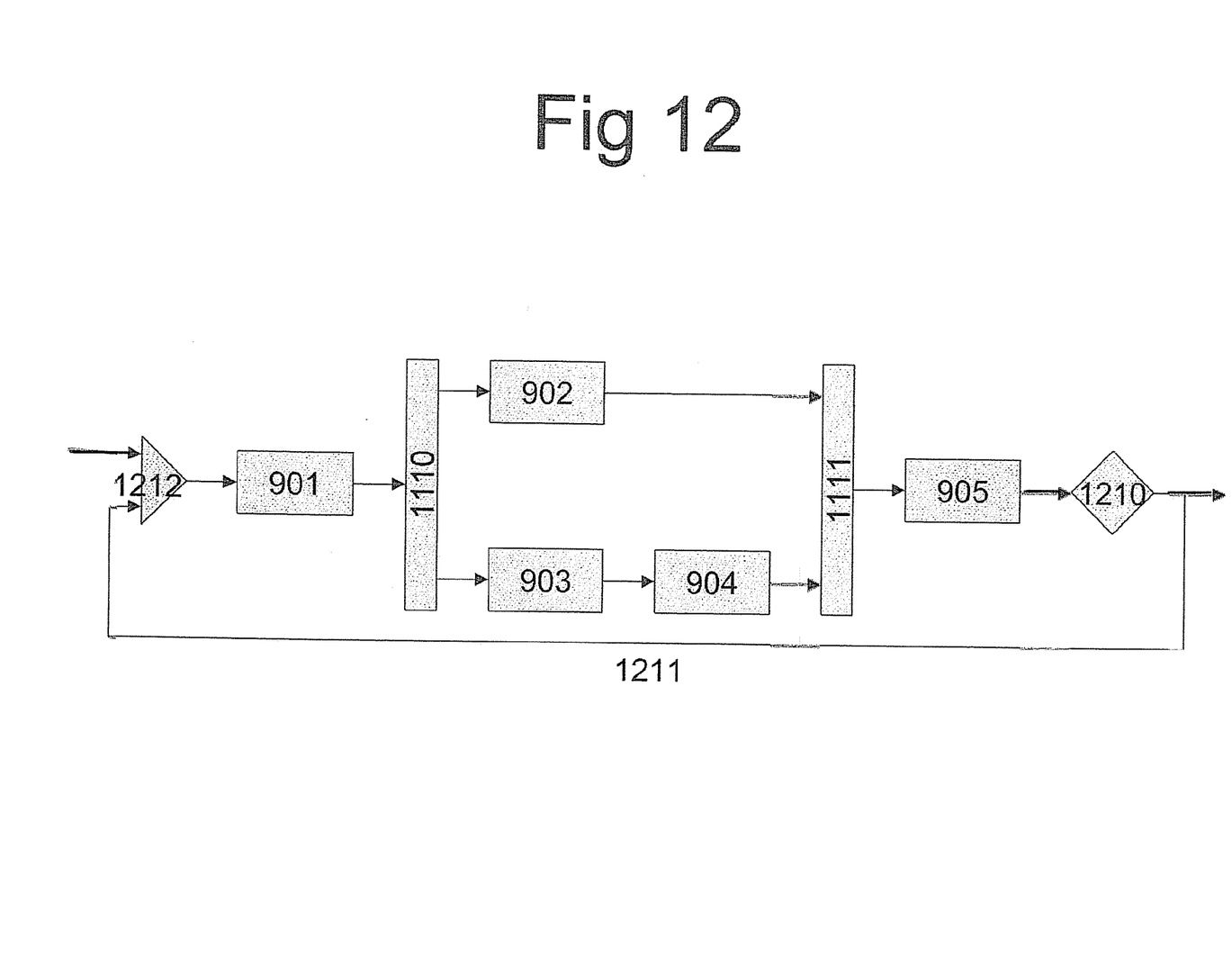
FIG. 12 illustrates an exemplary business model fragment to which a loop has been added, according to an exemplary embodiment.

FIG. 12 illustrates an exemplary business process model including a loop 1210, 1211, and 1212 that was added to the process model after a selection of tasks 901 and 905.

In another implementation, the user places gateways on the canvas such that a merge gateway is followed by a decision gateway. If one of the branches of the decision gateway is not connected to any other element further downstream (i.e., further to the right) and a merge is found further upstream (i.e., further to the left) that is not fully connected, a backward connection may be added to the diagram. If more than one option exists to add a loop, the algorithm may connect the decision to the closest matching merge further upstream that has an unconnected incoming branch.

As described hereinbefore, exemplary embodiments introduce novel tool-supported semi-automatic methodologies and fully-automatic (i.e., interleaved or non-interleaved) for quickly creating and restructuring business process models. Exemplary embodiments may receive a set of disconnected model elements of a process model, and a connected process model is created by matching the geometric layout of the disconnected model elements to given patterns. Hereinafter, a flowchart of a method for automatic pattern based editing of business models (e.g., business models as presented by way of examples in FIGS. 1-12) is described with reference to FIG. 13.

Figure 13:
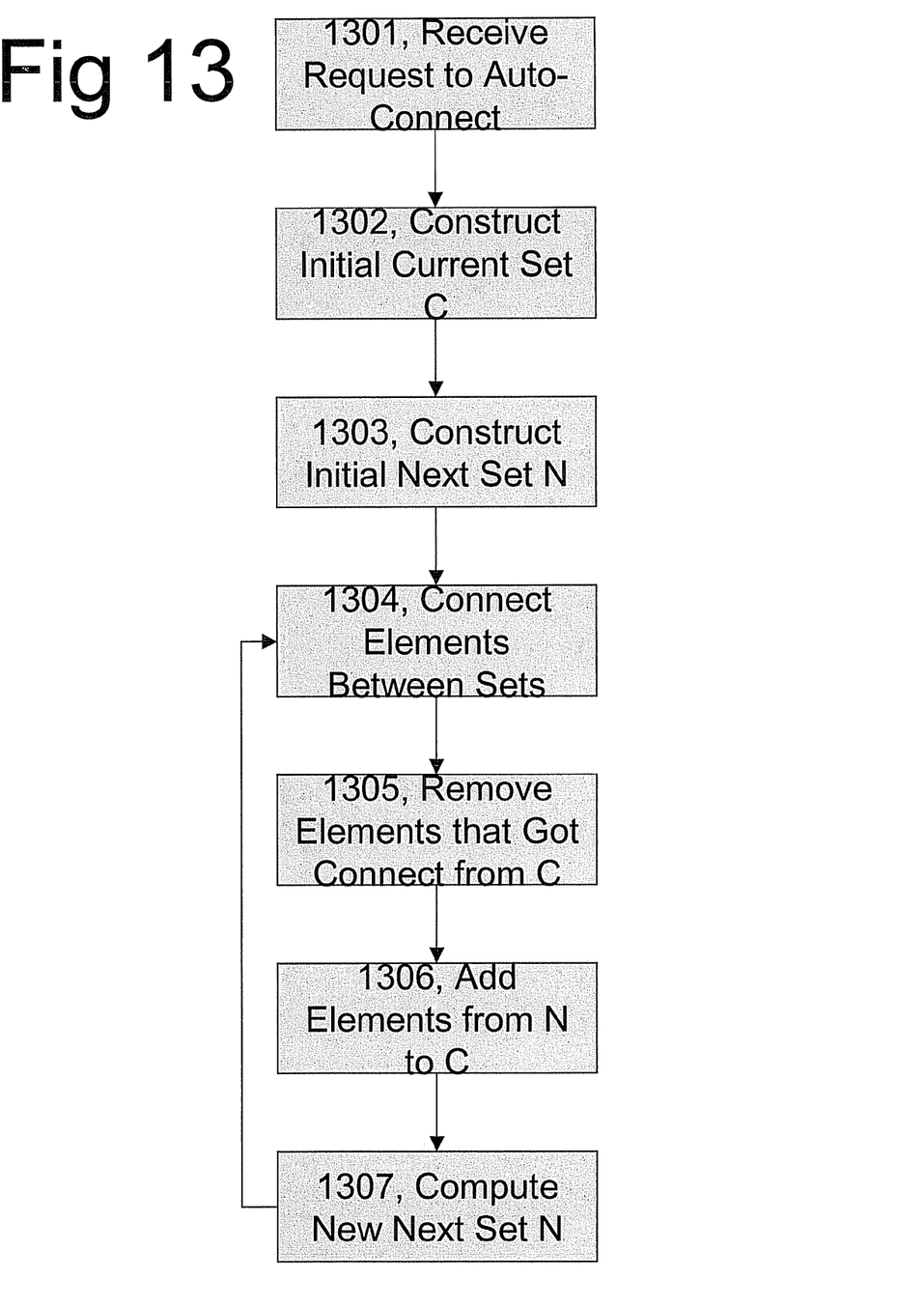
FIG. 13 illustrates a flowchart of a method for automatic pattern based editing of business models, according to an exemplary embodiment.

The method 1300 may include receiving a request to automatically connect elements of a business process model (or partially connected elements) at block 1301. For example, a user of a computer apparatus may create new tasks on a canvas or user interface. The canvas or user interface may have a general geometric or two-dimensional organization allowing for the method 1300 to approximate differences in terms of X-axis and Y-axis ranges between elements of the users business process model. The tasks/elements may be roughly organized in a logical manner decipherable by the method 1300. The user may select a portion or the entirety of the canvas for the method 1300 to automatically connect.

Upon receipt, or at substantially the same time as receipt of the request, the method includes constructing an initial current set C of elements at block 1302. The initial set C contains those elements that are positioned left-most on the canvas and that are approximately on the same X-axis position. If the current set does not contain a start node, a start node can be added to the process and a connection from the start node to all the elements in the current set can be drawn. If the current set contains more than one element, a decision is inserted between the start node and the elements. It is noted that this operation may be substantially similar to the first independent operation described hereinbefore, and thus exhaustive description is omitted for the sake of brevity.

The method 1300 further includes constructing the next set N at block 1303. The next set contains the left-most element that is not contained in the current set and all the elements that are approximately on the same X-axis. If no such elements can be found, all elements have been connected and the algorithm terminates by optionally adding a stop node to the model. If more than one element is contained in the current set (i.e., there are several branches that have not been merged yet) a merge gateway is inserted between the last elements of these branches and the stop node and the connections are properly drawn. It is noted that this operation may be substantially similar to the second independent operation described hereinbefore, and thus exhaustive description is omitted for the sake of brevity.

The method 1300 further includes connecting elements in the current set C with the next set N at block 1304. In this step, the algorithm attempts to connect the elements in the current set with those elements in the next set. It is noted that this operation may be substantially similar to the third independent operation described hereinbefore, and thus exhaustive description is omitted for the sake of brevity.

Once the method 1300 has connected the elements in the current set to those in the next set, it removes the elements that have been connected in the current set (step 1305), puts the elements from the next set into the current set (step 1306), computes a new next set (step 1307), and the method 1300 continues at block 1304 until all elements have been considered, automatically connected, or a request to terminate has been received.

Figure 14:
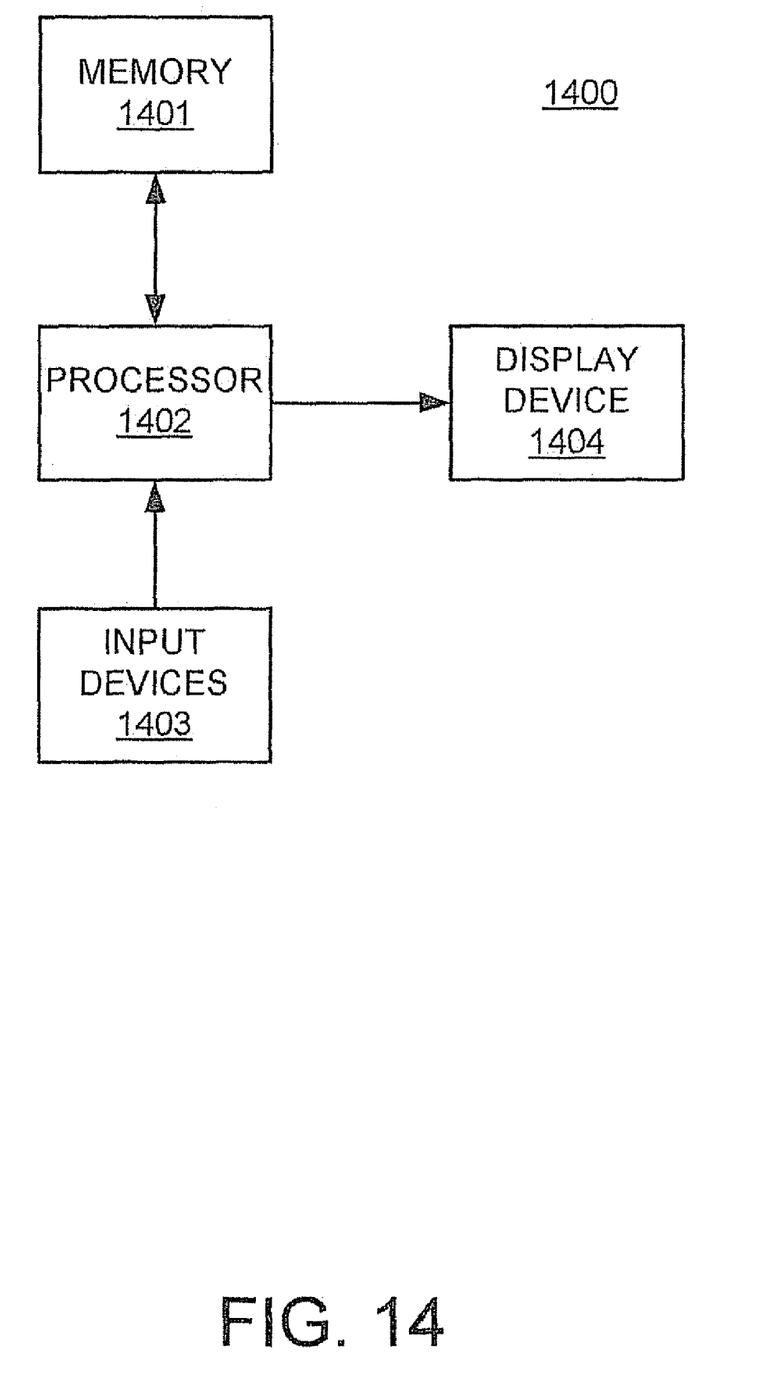
FIG. 14 illustrates a computer apparatus for pattern based editing of business models, according to an exemplary embodiment.

According to an exemplary embodiment, the method described hereinbefore may be implemented by a computer system or apparatus capable of processing a business model editing application. For example, FIG. 14 illustrates a computer apparatus for pattern based editing of business models, according to an exemplary embodiment. Therefore, portions or the entirety of the method may be executed as instructions in a processor 1402 of the computer system 1400. The computer system 1400 includes memory 1401 for storage of instructions and information, input device(s) 1403 for computer communication, and display device 1404. Thus, the present invention may be implemented, in software, for example, as any suitable computer program on a computer system somewhat system to computer system 1400. For example, a program in accordance with the present invention may be a computer program product causing a computer to execute the example method described herein.

The computer program product may include a computer-readable medium having computer program logic or code portions embodied thereon for enabling a processor (e.g., 1402) of a computer apparatus (e.g., 1400) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While an exemplary embodiment has been described, it will be understood that those skilled in the art, both now and in the future, may make various improvements and enhancements which fall within the scope of the claims which follow. These claims should be construed to maintain the proper protection for the invention first described.

What is claimed is:

1. A method of automatic pattern based editing of business process models on a canvas of business model editing application having an X-axis and a Y-axis, comprising:
   receiving a request to automatically edit a business process model;
   constructing an initial current set C of elements from the business model, wherein, the initial current set C contains all elements that are positioned left-most on the canvas and that are about on the same X-axis position, wherein the same X-axis position allows for an X-axis predetermined margin of error based on a deviation of a width of an element;
   constructing an initial next set N of elements from the business model, wherein the initial next set N contains the left-most element that is not contained in the initial current set C and all the elements that are about on the same X-axis or on an orientation that is mapped onto the X-axis, the orientation including a top-down orientation and a right-left orientation;
   connecting elements between the initial current set C and the initial next set N until all elements that could be connected in the initial current set C and the initial next set N have been connected, wherein, connecting is based on at least,
      connecting elements sequentially if the elements exist from left to right on the canvas, wherein elements are considered sequential if positioned on about the same Y-axis position, the Y-axis including a Y-axis predetermined margin of error based on the deviation of a height of the element, wherein the X-axis predetermined margin of error is greater than the Y-axis predetermined margin of error,
connecting elements in parallel or using a decision and merge combination if the elements exist from top to bottom on the canvas,
constructing a new current set from the elements that have not been connected and the elements in the next set, and
constructing a new next set; and
iterating the connecting and constructing until no more elements can be connected.

2. The method of claim 1, further comprising:
receiving a beginning point selection and an ending point selection;
verifying correctness of a loop model from the beginning point selection to the ending point selection; and
automatically adding a loop connection between the beginning point selection and the ending point selection based on the verification.

3. The method of claim 1, further comprising:
computing a new next set N', wherein the new next set N' includes elements not in the initial next set N; and
iteratively connecting elements of the business model until a request to cease automatic pattern based editing is received.

4. The method of claim 1, wherein the X-axis margin of error is about +/−100% and the Y-axis margin of error is about +/−66%.

* * * * *